United States Patent [19]

Johnson

[11] 4,178,006

[45] Dec. 11, 1979

[54] FURNITURE DOLLY

[76] Inventor: Richard E. Johnson, 3509 River Rd., Eugene, Oreg. 97404

[21] Appl. No.: 879,239

[22] Filed: Feb. 21, 1978

[51] Int. Cl.² .............................................. B62B 5/00
[52] U.S. Cl. .................................................. 280/79.1 A
[58] Field of Search ..................... 280/79.1 R, 99.1 A, 280/47.16, 79.2

[56] References Cited

U.S. PATENT DOCUMENTS

| | | | |
|---|---|---|---|
| 511,793 | 2/1894 | Philion | 280/79.1 R |
| 620,331 | 2/1899 | Knapp | 280/47.16 |
| 1,013,605 | 1/1912 | Lyon | 280/47.16 |
| 2,285,699 | 6/1942 | Everest | 280/47.16 |
| 2,314,129 | 3/1943 | Daley | 280/79.1 R |
| 3,558,152 | 1/1971 | Miles | 280/47.16 |

*Primary Examiner*—Robert R. Song
*Attorney, Agent, or Firm*—Klarquist, Sparkman, Campbell, Leigh, Hall & Whinston

[57] ABSTRACT

A furniture dolly comprises a cross-shaped frame having swivel casters at three corners thereof in normal contact with the floor and a fourth upraised swivel caster for negotiating obstructions. The dolly includes an upper furniture receiving ledge including a shelf onto which one end of an item of furniture can be placed by one man, after which the furniture is suitably moved in a desired direction with the upraised fourth caster extending forwardly. Should an obstruction be encountered, the upraised caster passes thereover and then acts as a brace while the remainder of the dolly is urged thereover.

10 Claims, 5 Drawing Figures

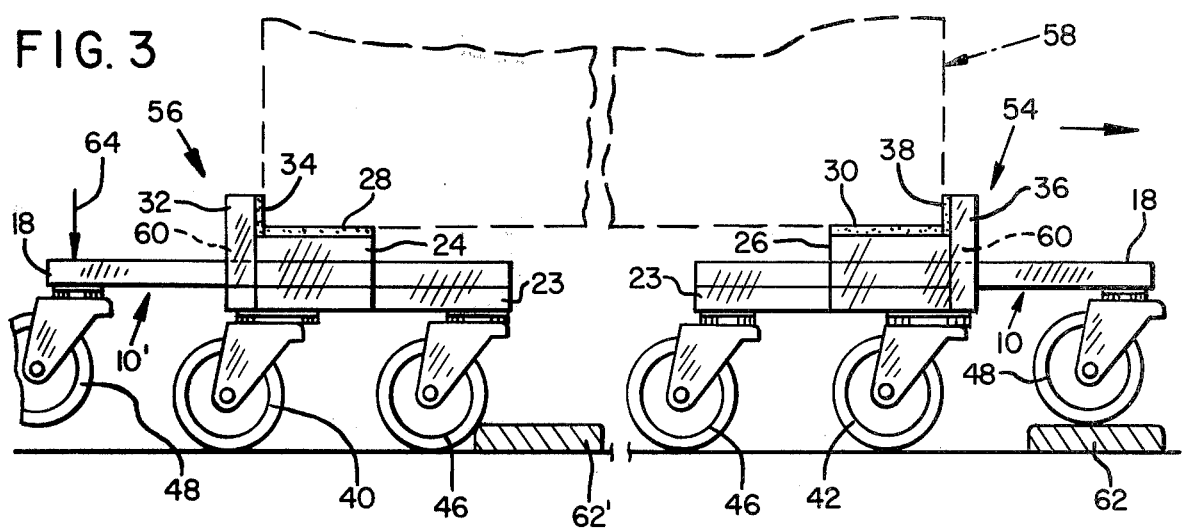
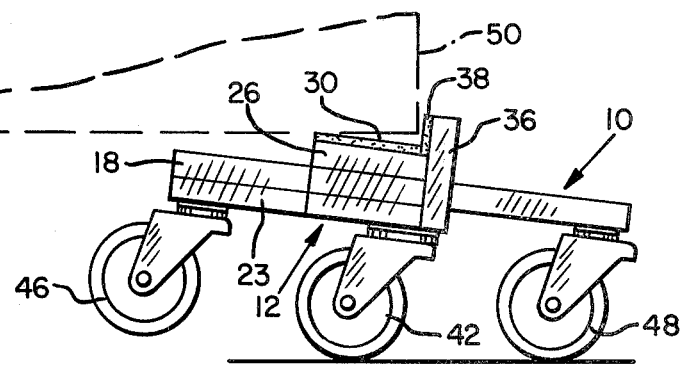
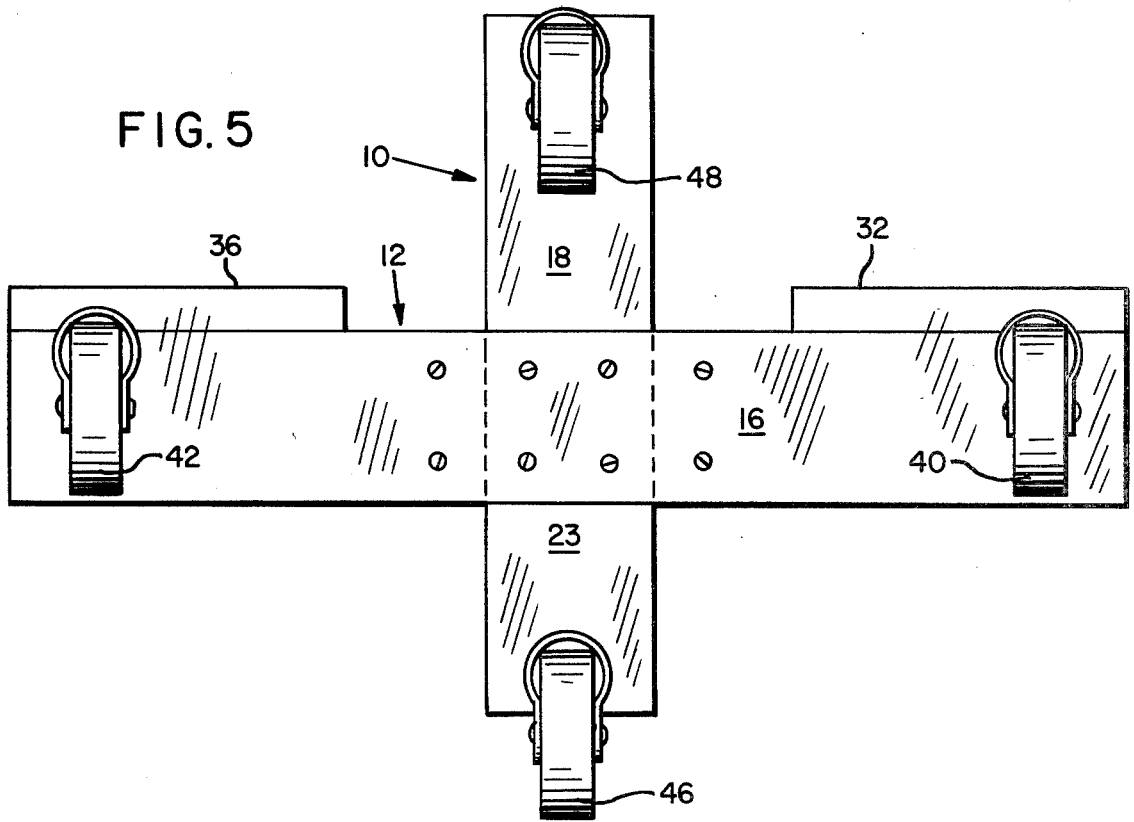

FURNITURE DOLLY

BACKGROUND OF THE INVENTION

The present invention relates to furniture moving dollies and particularly to a furniture moving dolly usable by one man for moving an item of furniture over various obstructions.

Furniture moving can be a time consuming and arduous task, especially in furniture stores or locations where any damage to the furniture must be meticulously avoided. Moving a large item of furniture frequently requires the services of at least two men in lifting the furniture to its new location. Alternatively, a conventional flat dolly can be employed, but again usually the services of two persons are required for initially placing the item of furniture onto the flat dolly. Unfortunately, the load can be difficult to maneuver. Negotiating the furniture upon such a dolly over a bump or obstruction can be particularly difficult, and brute force employed to overcome the obstruction may result in either damage to the furniture or possible slipping of the furniture off the dolly. Also, a central load bearing location on the furniture frequently does not exist, and the dolly must be placed under non-load bearing supports or weak and damageable locations on the furniture item.

SUMMARY OF THE INVENTION

According to the present invention, a furniture dolly includes a horizontal frame and four swivel casters secured in supporting relation thereunder adapting the dolly to traverse a substantially horizontal surface. The four casters include spaced first and second side casters, a third rearward caster, and a fourth forward caster, wherein the third and fourth casters are mounted on the frame to contact the horizontal surface in the alternative, adapting the frame to rock about the first and second casters. Obstructions can be negotiated with the fourth or forward caster initially in an upraised position, and then in a rotated bracing position to facilitate forward movement of the dolly over the obstruction. The frame of the dolly includes a furniture receiving ledge comprising a substantially horizontal shelf provided on its forward side with an upstanding backrest against which furniture can be placed. The furniture is supported on its normally rigid edges capable of bearing the load. Movement of the furniture in a forward direction is adapted to produce rotation of the furniture receiving ledge about an axis between the first and second casters as when an obstruction is encountered.

The furniture dolly according to the present invention is adapted to be used in pairs and obviates the necessity of requiring two men for locating furniture upon a single flat dolly or truck. One man can place one end of a furniture item on a dolly according to the present invention, and then locate the remaining end on a similar dolly for easy movement of the furniture to the desired location.

It is an object of the present invention to provide an improved furniture moving dolly adapted to negotiate bumps or other obstructions.

It is another object of the present invention to provide an improved furniture moving dolly adaptable for use by one man.

It is a further object of the present invention to provide an improved furniture moving dolly usable in pairs whereby one individual can movably support both ends of a furniture item.

It is a further object of the present invention to provide an improved furniture moving dolly adapted to support an item of furniture at load bearing locations.

It is a further object of the present invention to provide an improved furniture moving dolly which can be employed by one individual without injury to himself or damage to the furniture.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 3 is a side view of a pair of dollies according to the present invention, illustrating their use as a system for moving both ends of an item of furniture;

FIG. 4 is a side view of a furniture dolly according to the present invention, illustrating clockwise rotation thereof into a bracing position over an obstruction; and FIG. 5 is a bottom view of the furniture dolly according to the present invention.

DETAILED DESCRIPTION

Figure 1:
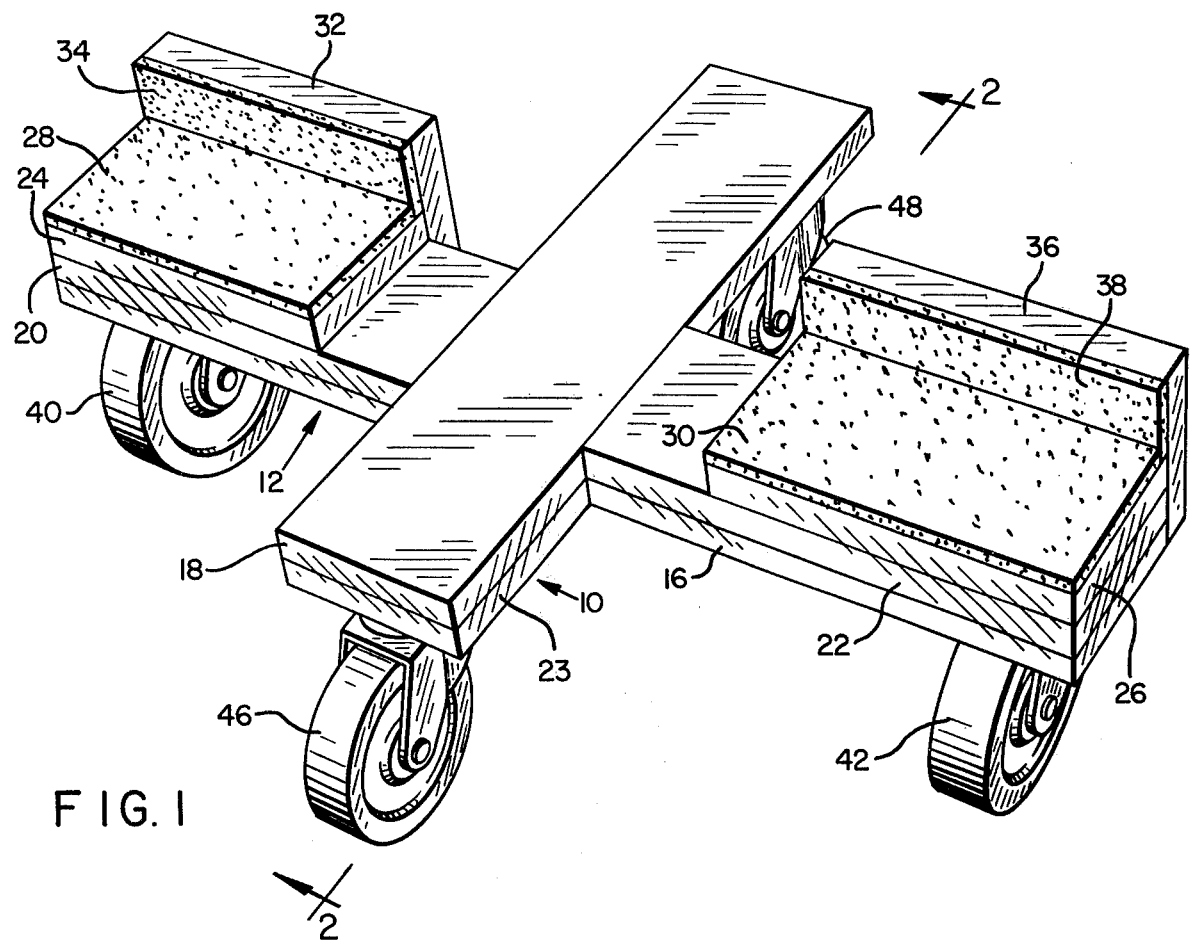
FIG. 1 is a perspective view of a furniture dolly according to the present invention.
Figure 2:
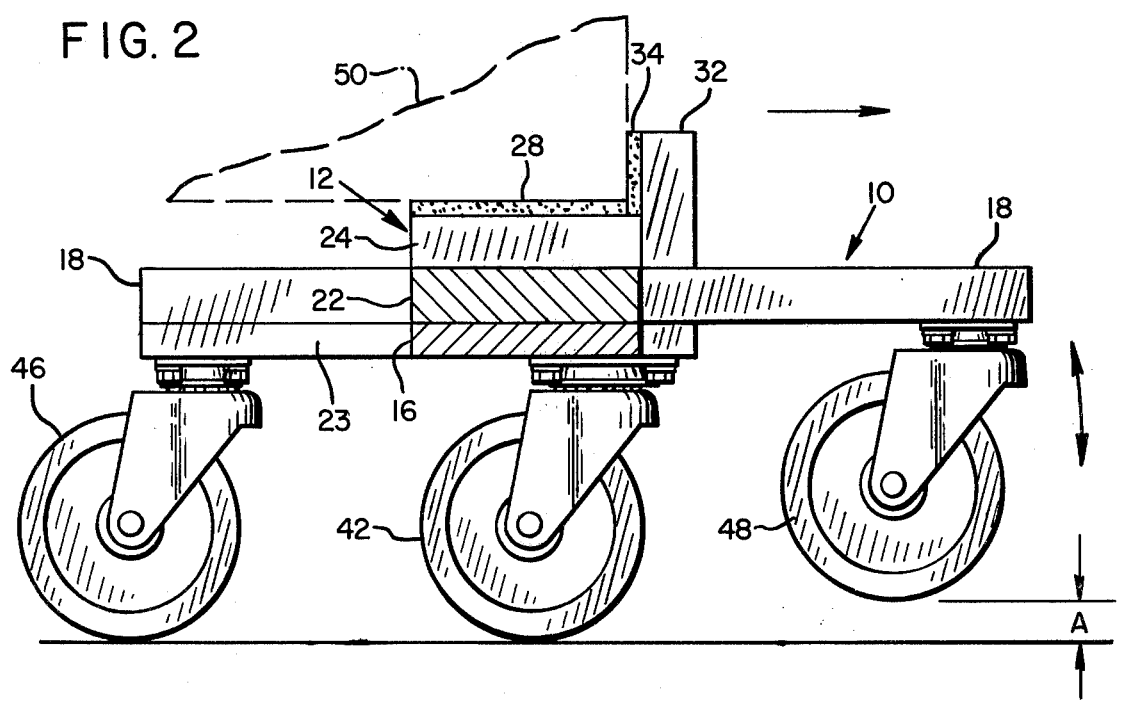
FIG. 2 is a cross-sectional view taken at 2—2 in FIG. 1.

Referring to the drawings, and particularly to FIGS. 1, 2 and 5, a furniture dolly according to the present invention comprises a cross-shaped wooden frame including a longitudinal arm 10 and a lateral arm 12 centrally joined to the longitudinal arm. The lateral arm includes a lower board 16 extending continuously across the dolly and to which upper continuous board 18 of the longitudinal arm is secured by means of wood screws. For completing a frame of substantially uniform thickness, the frame is completed employing upper lateral arm boards 20 and 22 secured to board 16 while being equal in thickness to longitudinal board 18. Also, a lower board 23 equal in thickness to lateral board 16 is joined to the underside of board 18 towards the rear of the frame. However, no lower board is joined to the underside of the forward end of the longitudinal arm, leaving the same foreshortened in thickness.

A laterally extending furniture receiving ledge is mounted upon the lateral arm 12 extending toward respective ends thereof and includes a left-hand flat shelf 24 as well as a right-hand flat shelf 26 having furniture cushioning pads 28 and 30 secured to their top surfaces. The pads suitably comprise a compressible or elastomeric material such as rubber or plastic foam for protecting the furniture. The ledge also includes a brace or backrest 32 joined to the forward side of lateral arm 12 in juxtaposition with shelf 24 and extending above the level of shelf 24 and pad 28 by a sufficient distance for bracing the edge of a piece of furniture resting upon the shelf. Backrest 32 is similarly provided with a pad 34 on its rearward side. Likewise, a brace or backrest 36 is located at the right forward end of lateral arm 12 in juxtaposition with shelf 26 and extending above the surface of shelf 26 and pad 30. A pad 38 is secured to the rearward side of backrest 36. The furniture receiving ledge is formed in the separate left and right sections so as to define a hand receiving slot therebetween, as hereinafter more fully described, whereby furniture can be lowered onto the ledge without causing injury.

The frame is supported upon four, equal-sized, swivel casters mounted upon the underside of the respective frame arms toward the ends thereof. First and second casters 40 and 42 are secured to the underside of board 16 toward the left and right ends thereof, and are also secured in part to the lower edge of backrests 32 and 36 such that furniture resting upon flat shelves 24 and 26 will have a tendency to rotate the dolly in a direction for urging the rear end of longitudinal arm 10 toward the horizontal supporting surface therebeneath. Rearward and forward swivel casters 46 and 48 are mounted respectively to the underside of longitudinal arm 10 toward the rearward and forward ends thereof, namely, upon the underside of board 23, and the underside of board 18 where it is exposed at the front of the frame. As can be seen from FIG. 5, the swivel casters are symmetrically located. I.E., a line drawn between casters 46 and 48 bisects a line between casters 40 and 42 and vice versa. However, due to the construction of the frame and due to the additional weight of the frame toward caster 46, the frame has a normal or stable condition wherein its top surface is horizontal, with casters 40, 42 and 46 normally contacting the horizontal floor surface therebeneath. Furthermore, as indicated, an item of furniture 50 supported upon the furniture receiving ledge, and particularly upon horizontal shelf 24 as shown in FIG. 2, tends to maintain the frame in its horizontal attitude. The first, second and third casters define a plane, normally and selectably coincident with the horizontal floor surface, with third caster 46 providing bracing, while the fourth caster 48 is mounted on the frame in an upraised position with respect to the plane. Thus, caster 48 is normally upraised from the floor surface by a distance A as shown in FIG. 2 equal to the thickness of board 23.

All casters suitably have the same diameter and are suitably three-inch, dual ball bearing casters. However, it is not a requirement in every case that the casters be identical. For instance, caster 48 may be of smaller diameter for providing the desired clearance, A. However, the larger diameter is preferred to facilitate negotiation over uneven surfaces.

As the load is urged forwardly, i.e., to the right as illustrated in FIG. 4, toward an obstruction 62 such as a door sill or rug, caster 48 being upraised will first pass over the obstruction and the frame will maintain its horizontal attitude with caster 46 providing bracing until casters 40 and 42 encounter the obstruction. At this time, force urging the load to the right will cause the frame to rotate or rock about an axis between casters 40 and 42 in a clockwise direction until caster 48 contacts the floor surface. Caster 48 now prevents further rotation of the frame and braces the frame as the furniture or other load is forced hard forward over the obstruction. Thus caster 48 braces the frame as casters 40 and 42 move up and over the obstruction 52. The furniture or other load tends to be urged against the backrest, for example backrest 32, but the load is not fastened to the backrest or shelf. It will be seen the device is braced for moving over the obstruction without the rearward portion of longitudinal arm 10 gouging or otherwise coming in contact with the furniture item 50. That is, board 18 will not raise high enough to contact the load. Moreover, even if board 18 did contact the load, no bracing would be offered thereby in many instances inasmuch as the load would frequently comprise furniture having a relieved or soft undersurface such as a cloth surface on the underside or back of a sofa or the like. Of course, as soon as the side casters 40 and 42 clear the obstruction, the frame will tend to return to its horizontal position. As can thus be seen, the positioning of caster 48 enables the furniture dolly to move over obstructions as the caster 48 is upraised from the floor surface, and then caster 48 braces the dolly in a forward direction to prevent upset of the load until the obstruction has been cleared.

The furniture dolly according to the present invention is intended to be used primarily in pairs, as illustrated in FIG. 3. Thus, a first such dolly is illustrated at 54 positioned at the forward end of a piece of furniture or other load 58, while a substantially identical dolly 56 is located at the rear end of the same load, with dolly 56 being reversed 180 degrees in orientation for receiving the under edge of the trailing end of the load 58. This system is much superior to the conventional method of moving furniture on a single truck or dolly usually located centrally underneath the item of furniture. Utilization of a single, central dolly ordinarily requires two men for placement of the furniture upon the dolly and moreover may contact the furniture on non-load bearing supports where the furniture may have no substantial frame, for example in the middle of a sofa or the like. Furthermore, once a single dolly is centrally located under the furniture, it can be very awkward to guide or maneuver, for instance over bumps, cords, rugs, elevator entrances, etc. In the system illustrated according to FIG. 3, each end of the furniture item or load 58 is conveniently and safely positioned on one of the dollies 54 and 56 by one man. Note the load is carried at the corners where ample bearing supports are normally located and can be suitably positioned upon one of the dollies. Furthermore, the dolly is accessible at the end and can be pushed against if desired. The furniture receiving ledge is divided into left and right portions, as hereinbefore discussed, leaving hand receiving aperture 60 centrally over longitudinal arm 10. Consequently, a man moving a furniture item can raise the end thereof, slide the dolly under the end corner, e.g. with one foot, and lower the furniture item onto the furniture receiving ledge while still leaving a hand receiving opening 60. Therefore, the individual's hand can be removed after the furniture rests firmly on the ledge without either injury to the individual or damage to the furniture. The ledge, although leaving the hand opening, is nonetheless relatively low to the ground and consequently does not require the furniture to be moved to a very high level.

After positioning the furniture item upon the two dollies 54 and 56 as illustrated in FIG. 3, one man can move the furniture easily in any given direction, and can easily steer the furniture item through doors, along aisles, etc., due to the easy steerability of the large casters. Should an obstruction be encountered, such as illustrated at 62 in FIG. 3, caster 48 will pass thereover and subsequently brace dolly 54 as illustrated in FIG. 4, while the remaining casters are urged thereover. When the rearward dolly, 56, encounters the same or another obstruction 62' the person moving the furniture need only press downwardly with his foot against longitudinal arm 10' as illustrated by arrow 64. Consequently, the dolly 56 will be rotated in a counterclockwise direction and caster 46 will pass over the obstruction and brace the dolly as casters 40 and 42 pass thereover. In many instances, of course, downward pressure against longitudinal arm 10' of dolly 56 will not be necessary, especially in the case of smaller obstructions. Naturally, when the furniture has been moved to the desired location, unloading thereof is as easy as loading, and one man can lift the furniture through aperture 60 while moving the particular dolly away with his foot.

While I have shown and described a preferred embodiment, it will be apparent to those skilled in the art that many changes and modifications may be made without departing from my invention in its broader aspects. I therefore intend the appended claims to cover all such changes and modifcations as fall within the true spirit and scope of my invention.

I claim:
1. A furniture dolly comprising:
   a frame and four swivel casters secured in supporting relation to said frame adapting the same to traverse a substantially horizontal surface,
   said four swivel casters including spaced first and second side casters located toward first and second lateral sides of said frame, a third caster rearward of a line between said first and second casters, and a fourth caster forward of a line between said first and second casters, wherein said third and fourth casters are mounted on said frame to contact said horizontal surface in the alternative adapting said frame to rock about said first and second casters to a position where either said third caster or said fourth caster supports said frame upon the horizontal surface,
   said frame having a laterally extending furniture receiving ledge comprising a substantially horizontal shelf above the level of said first and second casters and extending in a direction approximately parallel to said line between said first and second casters, said substantially horizontal shelf being forward of said third caster and rearward of said fourth caster and being narrow compared to the distance between said third and fourth casters, said shelf being provided proximate its forward edge toward said fourth caster with an upstanding backrest completing a furniture holding configuration with said shelf that is approximately L-shaped in cross section against which said furniture may be placed, adapting movement of said furniture to produce rotation of said ledge about an axis between said first and second casters to place either said third caster or fourth caster in a bracing position relative to furniture moved on said dolly.

2. The dolly according to claim 1 wherein said ledge is located in general alignment above said line between said first and second side casters.

3. The dolly according to claim 2 wherein said ledge is divided into first and second spaced side portions to provide a hand receiving opening between said frame and furniture resting upon said ledge for permitting positioning of furniture on said dolly without injury.

4. A furniture dolly comprising:
   a cross-shaped frame including a lateral arm and a longitudinal arm secured together centrally of both arms, and four swivel casters supporting said frame for traverse over a substantially horizontal surface,
   first and second of said casters being secured to the underside of said lateral arm toward the lateral ends thereof,
   third and fourth of said casters being secured to the underside of said longitudinal arm respectively toward the rearward and forward ends thereof,
   said dolly being adapted to rest on said first, second and third casters defining a plane selectably coincident with said horizontal surface, with said fourth caster being mounted on said frame in an upraised position with respect to said plane,
   and a furniture receiving ledge mounted on said lateral arm comprising a substantially horizontal shelf provided with an upstanding rest therealong against which furniture may be placed while positioned on said shelf, whereby movement of said furniture can produce rotation of said ledge about an axis between said first and second casters to place either said third caster or fourth caster in a bracing position relative to furniture moved on said dolly.

5. The dolly according to claim 4 wherein said ledge is divided into two sections defining a hand receiving aperture between furniture resting on said ledge and said frame to prevent injury when said furniture is placed on said ledge.

6. The dolly according to claim 4 wherein said ledge including said horizontal shelf and said upstanding rest are provided with compressible pads for protecting said furniture.

7. The dolly according to claim 4 wherein said substantially horizontal shelf is parallel to said plane.

8. The dolly according to claim 4 wherein said casters are of equal diameter and wherein the underside of the forward end of said longitudinal arm mounting said fourth caster is positioned further from said plane than are the undersides of the arms where said first, second and third casters are mounted.

9. The dolly according to claim 4 wherein said lateral arm and the rearward portion of said longitudinal arm are of equal thickness defining a common upper surface for said frame and a common lower surface for said frame for mounting said first, second and third casters, the forward end of said longitudinal arm towards said fourth caster having a common top surface with said frame but having a lesser thickness for mounting the fourth caster therebeneath in spaced relation from said plane,
   said furniture receiving ledge comprising first and second shelves mounted on the upper side of said lateral arm toward the ends thereof, and said upstanding rest comprising first and second flat braces mounted upon the forward side of said lateral arm in juxtaposition with said shelves and rising above the level of said shelves on the side of said lateral arm toward the fourth caster.

10. A furniture moving system comprising:
   first and second dollies for positioning at first and second ends of a furniture item, each said dolly comprising a frame having four swivel casters secured in supporting relation to said frame adapting the same to traverse a substantially horizontal surface,
   said four swivel casters for each dolly including spaced first and second side casters located toward first and second lateral sides of a said frame, a third caster rearward of a line between said first and second casters, and a fourth caster forward of a line between said first and second casters, wherein said third and fourth casters are mounted to contact said horizontal surface in the alternative, each said frame having a laterally extending furniture receiving ledge comprising a substantially horizontal shelf above the level of said first and second casters extending in a direction approximately parallel to said line between said first and second casters, said substantially horizontal shelf being forward of said third caster and rearward of said fourth caster and being narrow compared to the distance between said third and fourth casters, said shelf being provided proximate its forward edge toward said fourth caster with an upstanding backrest completing a furniture holding configuration with said shelf that is approximately L-shaped in cross section against which said furniture may be placed, adapting movement of said furniture to produce rotation of said ledge about an axis between said first and second casters to place either said third caster or fourth caster in bracing position relative to the furniture moved.

* * * * *